J. H. CHAMBERS.
Manufacture of an Improved Fertilizer from Stable Manure.
No. 229,955.  Patented July 13, 1880.
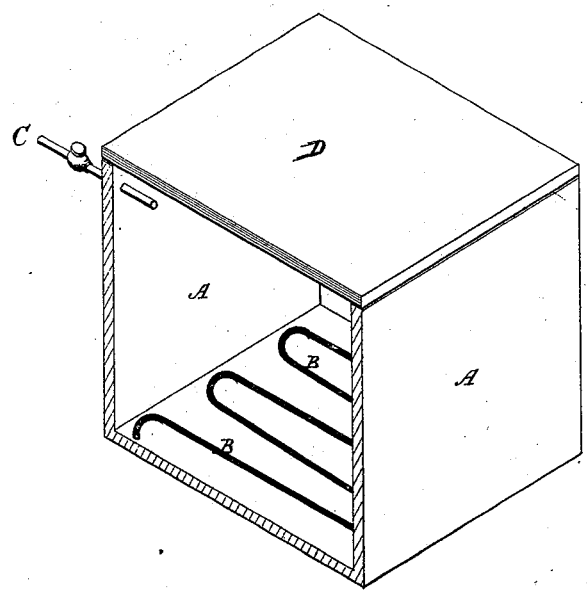

UNITED STATES PATENT OFFICE.

JOHN H. CHAMBERS, OF NEW YORK, N. Y.

MANUFACTURE OF AN IMPROVED FERTILIZER FROM STABLE-MANURE.

SPECIFICATION forming part of Letters Patent No. 229,955, dated July 13, 1880.

Application filed June 9, 1879.

*To all whom it may concern:*

Be it known that I, JOHN H. CHAMBERS, of the city, county, and State of New York, have invented certain new and useful Improvements in the Manufacture of an Improved Fertilizer from Stable-Manure, of which the following is a specification.

This invention relates to the treatment of stable-manure, whereby it is rapidly decomposed and the germs of weed and other objectionable seeds killed.

It consists, first, in a method of treating such manure, and, second, in the new article of manufacture resulting from such process.

To carry out my process I use an air-tight tank, in which the manure is placed, said tank having a means of heating, and also a pipe for injecting water or steam to moisten, the manure during the process.

The drawing represents a perspective view illustrating the tank I propose to use in carrying out my invention, part being broken away to show interior of the same.

In the case here presented, A represents a tank, bin, or pit, made of wood, metal, or masonry, or a combination of such material as may be deemed most expedient in practice.

B represents a steam-coil arranged on the bottom within the aforesaid tank, bin, or pit.

C represents a steam-pipe, which extends through the side of the tank, bin, or pit, at or near its top, the said pipe being provided with a suitable valve or stop-cock to regulate the supply of steam.

D represents a hinged or detachable top, forming a cover for the bin, tank, or pit.

In carrying out my process I first fill the tank, bin, or pit with fresh manure, then close the top tightly and let steam into the coil, which causes the manure to sweat and rot very rapidly without burning or becoming destroyed, as it would if not confined in a closed chamber; and to further increase the heating and supply moisture when necessary I inject steam at intervals through a pipe situated at or near the top of the tank, bin, or pit.

It is not intended to subject the manure to a high degree of heat, but only to moderately warm it—say to about 125° Fahrenheit. The heat should be kept upon each batch of manure from three to ten days, or even more, according to the material or its condition, as some kinds of manure will require longer treatment than others. At intervals, varying also with the condition of the manure, water or steam should be let on the heated mass, so as to keep it at the right degree of humidity, as simply heating alone would burn the manure, rendering it worthless.

Manure subjected to this treatment will be thoroughly decomposed, the seed-germs therein killed, its appearance changed, and it is rendered practically inodorous. Its color will be found to be different from ordinary stable-manure, no matter how long the latter may be rotted, as the effect of the thorough heating, combined with the moisture, so thoroughly destroys the seed-germs and the straw usually found mixed with stable-manure that it presents a more uniform and darker color than is found in ordinary stable-manure, no matter how well rotted. The material may therefore be readily distinguished by its color from similar material rotted in the ordinary manner; but the main difference by which it can be distinguished consists in being practically* inodorous.

Athough thus practically inodorous, it will be found that its quality will be better than the ordinary rotted manure, as in the process of rotting in the open air usually practiced a large proportion of the ammonia escapes, whereas manure rotted in a closed chamber, as in my process, absorbs the ammonia and retains it in an inodorous form.

Manure prepared by my process has, moreover, the great advantage that the moisture causes all seed contained therein to germinate and rot thoroughly, which not only increases the value of the manure as manure, but such seed-germs having been killed, a most prolific cause of weeds will be avoided, which is an item of great importance to the farmer and gardener.

I do not limit myself solely to the use of a steam-coil laid on the bottom of the tank, bin, or pit as a means of heating, as other heat, such as air, water, &c., may be applied and used with like result.

It is a well-known fact that fresh manure will heat and burn itself up if left alone in bulk in the open air; but by simply confining it in a suitable tank, bin, or pit, with a close-fitting top to confine the moisture and exclude the oxygen, this difficulty is effectually overcome, and the natural heat produced by the manure will be sufficient to thoroughly rot the same rapidly, but not quite so quickly as in cases where there is an artificial heat applied, as heretofore described.

In cases where I do not use steam as a means of moistening I inject a spray of cold water through a pipe at intervals, so as to increase the sweating of the manure and ripen it more rapidly for use.

I do not claim to be the first to heat excrementitious matter by steam or other heat, as I am aware that such matter, in a semi-fluid condition, has been subjected in partly-closed vessels to a boiling heat, for the purpose of evaporating it; but such heat was only intended to be kept up for a short time, without any intention of rotting the matter, which rotting is entirely unnecessary in the treatment of the material intended to be subjected to this boiling process, and the apparatus used for evaporating was entirely unfitted to be employed on fresh or even partly-rotted stable-manure.

Having thus described my invention, what I claim as new, and desire to secure by Letters Patent, is—

1. The process herein described of rotting stable-manure, consisting in subjecting it to a moderate heat in a closed chamber and moistening it at suitable intervals, substantially as and for the purpose specified.

2. The new article of manufacture herein set forth, consisting of inodorous rotted stable-manure of a uniform dark color, and having the normal quantity of ammonia capable of being produced preserved in the mass, as specified.

JOHN H. CHAMBERS.

Witnesses:
CHARLES H. NASH,
WILLIAM H. LEWIS.